Feb. 23, 1943.  J. A. MAURER, JR  2,312,259
OPTICAL SYSTEM
Filed July 2, 1940   3 Sheets-Sheet 1

INVENTOR
JOHN A. MAURER, JR.
BY Otto J. Nothrounsohn
AGENT

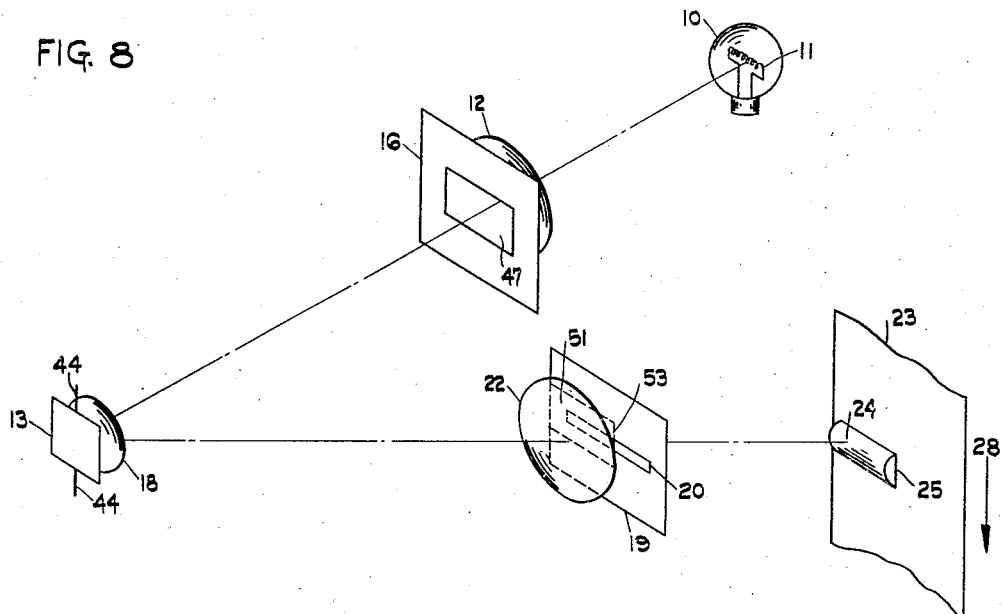
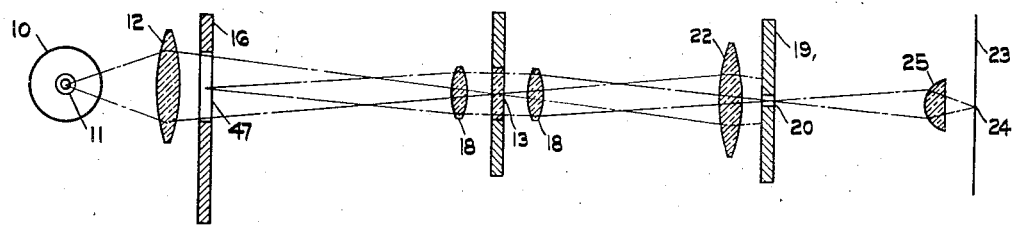
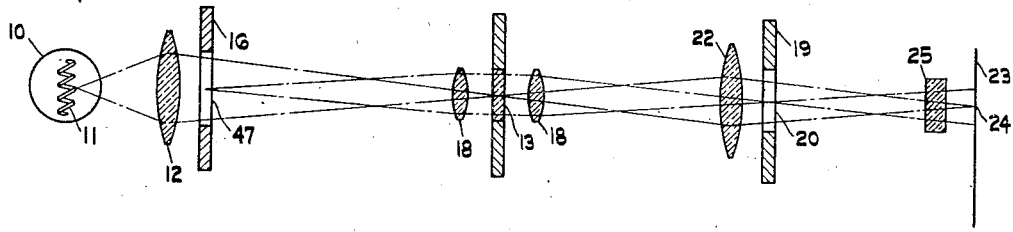

Patented Feb. 23, 1943

2,312,259

UNITED STATES PATENT OFFICE 2,312,259

OPTICAL SYSTEM

John A. Maurer, Jr., New York, N. Y., assignor, by mesne assignments, to J. A. Maurer, Inc., a corporation of New York Application July 2, 1940, Serial No. 343,615

24 Claims. (Cl. 179—100.3)

This invention relates to optical systems for the photographic recording of electrical impulses on a moving film such as are used in sound recording, picture transmission, and the like. More particularly, it relates to optical systems of this class which produce impulse records of constant width but varying intensity. Such records are known as variable density records.

The optical systems for variable density recording used in present-day practice commonly employ either a glow lamp, or a string oscillograph or light valve. These devices for translating electrical impulses into vibrations of a beam of light have certain inherent drawbacks which are generally known and hence need not be stated here in detail. It has therefore been proposed to employ, for variable density recording, optical systems having a mirror oscillograph or similar translating device, and it is an object of the invention to provide an improved optical system of this type.

Another object of the invention is the provision of an optical system of this type which is particularly satisfactory as regards efficiency of illumination, convenience of adjustment, and ease of manufacture.

Another object of the invention is the provision of an optical system of this type by means of which a linear relation between the electrical impulses to be recorded and the transparency of the record used for their reproduction may easily be effected.

Another object of the invention is the provision of an optical system of this type which may be built with small physical size and at comparatively little cost.

Another object of the invention is the provision of an optical system of this type which permits its visible adjustment and also visible monitoring of the recording of the electrical impulses in a particularly convenient and accurate manner.

Still other objects and advantages of the invention include those which are hereinafter stated or apparent or which are incidental to the invention.

The objects of the invention are substantially achieved by providing an optical system having means for producing a line of light extending in a direction at right angles to the direction in which the film moves at the recording point, that is, the point at which the optical axis of the system strikes the film. The optical system furthermore has means for varying the length of the aforementioned line of light in accordance with the electrical impulses to be recorded, and finally means imaging said line of light and acting only in a plane which is at right angles thereto and extends through the recording point. By the cooperation of these three means, there is produced at the recording point a final line image the intensity of which varies in accordance with the electrical impulses to be recorded.

Throughout the present specification, the direction in which the film moves at the recording point, and the directions parallel to it, will be called vertical, and the direction in which the line of light of varying length extends, and the directions parallel to it, will be called horizontal, the horizontal directions being at right angles to the vertical directions. Moreover, the plane in which the means imaging the line of light act will be called the vertical plane, and the plane which contains the line of light, and which is at right angles to the vertical direction, will be called the horizontal plane, the horizontal plane being at right angles to the vertical plane.

It will thus be seen that in the present specification the terms "vertical" and "horizontal" will not be used in any absolute sense but merely as indicating relative position or direction, and that choice between these terms has been determined merely by convenience in description and illustration.

The invention will be better understood when the following description is considered with the accompanying drawings of certain presently preferred embodiments thereof, and its scope will be pointed out in the appended claims.

Figs. 4 to 7 show in elevation modifications of an element employed with the optical system shown in Figs. 1 to 3, Fig. 8 is a diagrammatic perspective view of another embodiment of the invention, Fig. 9 is a diagrammatic longitudinal section in the vertical plane of the optical system shown in Fig. 8, the optical axis being represented as a straight line and an oscillograph mirror being represented as an aperture.

Figure 11:
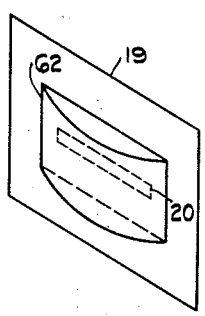

Fig. 10 is a corresponding section in the horizontal plane,

Fig. 11 is a perspective view of a modification of an element common to the optical systems shown in Figs. 1 to 3 and 8 to 10.

Figure 12:
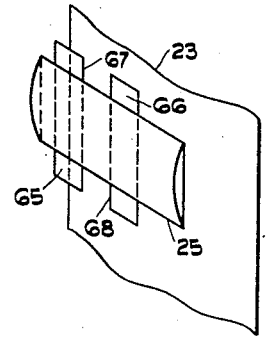
Figure 13A:
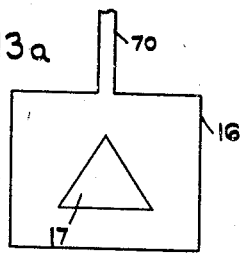
Figure 13B:
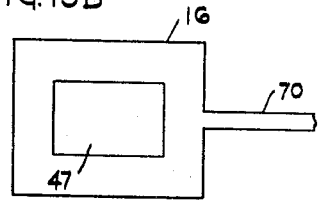

Fig. 12 is a perspective view of another modification of the optical systems shown in Figs. 1 to 3 and 8 to 10, and Figs. 13a and 13b show adaptations to a particular purpose of an element common to the optical systems shown in Figs. 1 to 3 and 8 to 10.

Throughout the drawings, identical parts are designated by identical reference characters.

Figure 1:
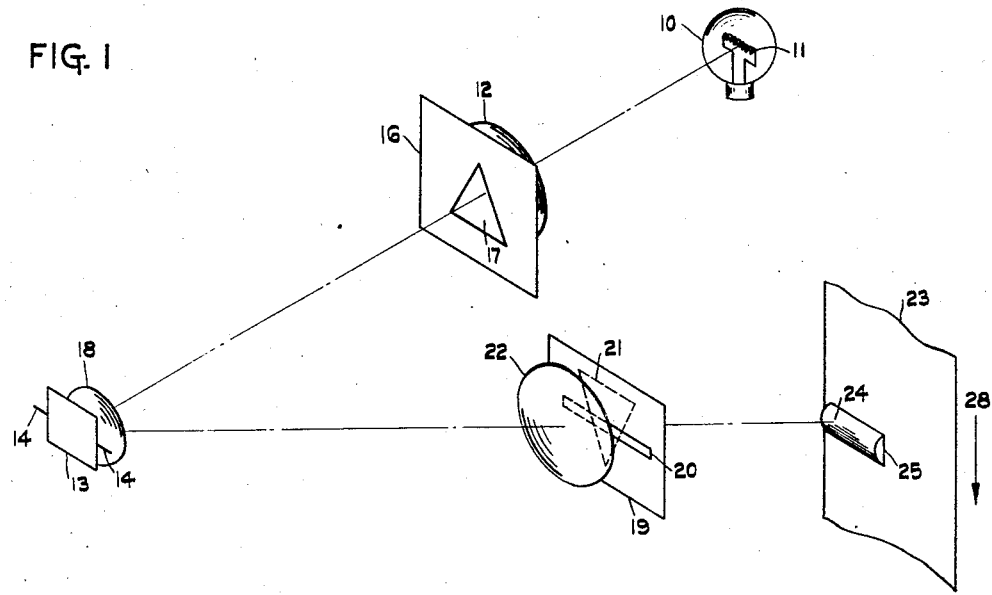
Fig. 1 is a diagrammatic perspective view of one embodiment of the invention.
Figure 2:
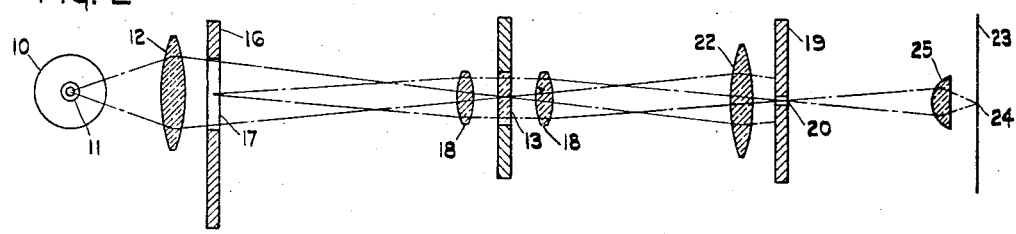
Fig. 2 is a diagrammatic longitudinal section in the vertical plane of the optical system shown in Fig. 1, the optical axis being represented as a straight line and an oscillograph mirror being represented as an aperture.
Figure 3:
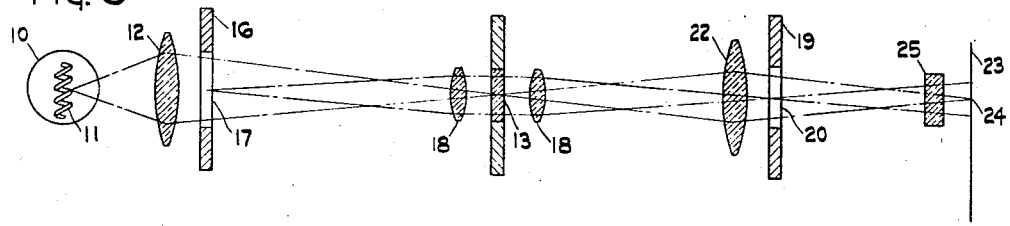
Fig. 3 is a corresponding section in the horizontal plane.

Referring first to Figs. 1 to 3, there is shown a recording light source such as an incandescent lamp 10. The filament 11 of lamp 10 is focused by a suitable condenser lens 12, preferably of wide aperture, on the mirror 13 of an oscillograph galvanometer (not shown) or similar device translating electrical impulses into mechanical vibrations. The axis 14—14 about which mirror 13 is mounted to vibrate extends horizontally.

A screen 16 is placed adjacent to lens 12. Screen 16 has an opening 17 which is an isosceles triangle with its base extending horizontally. Opening 17 is uniformly illuminated by lamp filament 11 and imaged by means of a spherical lens 18, placed in front of mirror 13, on a screen 19 in which a slit 20 extends horizontally. As lens 18 is spherical and hence acts in both the vertical and horizontal planes (see Figs. 2 and 3), a uniformly illuminated image 21 of opening 17 is formed in the plane of slit 20, which plane is at right angles to both the vertical and horizontal planes and contains slit 20. Image 21 illuminates, in its turn, a portion of slit 20.

When the electrical impulses to be recorded are applied in known manner to the oscillograph galvanometer on which mirror 13 is mounted, mirror 13, being deflected in accordance therewith, moves image 21 vertically, that is, across slit 20. This vibration of image 21 across slit 20 results in variations of the length of that portion of slit 20 which is illuminated by image 21. In other words, there appears at slit 20 a line of light the length of which varies at both its ends in accordance with the electrical impulses to be recorded.

A spherical lens 22, preferably of wide aperture, is placed adjacent to screen 19. Lens 22 produces on, or in the neighborhood of, film 23, that is, approximately at the recording point 24, an image of mirror 13, light from lamp filament 11 being directed upon mirror 13 by condenser lens 12. To throw the image of mirror 13 slightly out of focus with respect to film 23 has the advantage that the ordinarily coiled structure of lamp filament 11, which is reproduced on mirror 13, is not re-imaged on film 23 where it would cause striations of a generally undesirable character.

In the vertical plane, the action of spherical lens 22 is barred by screen 19 (see Fig. 2). But by its action in the horizontal plane lens 22 produces, at the recording point 24, an even distribution of whatever part of the light flux in image 21 is permitted to pass slit 20. This even distribution takes place within approximately the horizontal extension, or length, of the image of mirror 13 produced by lens 22 (see Fig. 3), which image length should therefore be at least equal to the horizontal extension, or with, of the impulse record desired. Thus, by its action in the horizontal plane, lens 22 concentrates at the recording point 24 the light flux passing through slit 20.

As the focal length of spherical lens 22, in order to form an image of mirror 13 approximately at the recording point 24, must be large compared to its distance from screen 19, lens 22 does not interfere with the imagery, by spherical lens 18, of opening 17 in the plane of slit 20.

Between screen 19 and film 23 there is placed a cylindrical lens 25, which has its cylinder axis horizontal and therefore does not act in the horizontal plane. In the vertical plane, however, cylindrical lens 25 forms on film 23 at the recording point 24 an image of the illuminated portion of, that is, of the line of light appearing at, slit 20. By virtue of this action of cylindrical lens 25, the part of the light flux which passes through slit 20 appears on film 23 at the recording point 24 as a final line image, the horizontal extension or length of which is determined by the length of the image of mirror 13 formed by spherical lens 22 (see Figs. 2 and 3). As long as some part of image 21 remains over slit 20, this image length remains constant no matter into what position mirror 13 is deflected, and for that reason the length of the final line image remains constant regardless of the length given by the deflection of mirror 13 to the line of light appearing at slit 20.

When therefore the length of the line of light appearing at slit 20 varies on account of the deflection of mirror 13 in accordance with the electrical impulses to be recorded, these variations of the amount of the light flux permitted to pass through slit 20 become manifest as variations of the intensity of the final line image because the light flux contained in any given length of the illuminated portion of slit 20 is, at the recording point 24, evenly distributed horizontally over a definite length by reason of the action of spherical lens 22 in the horizontal plane. As the vertical extension or width of the final line image is determined by the action of cylindrical lens 25 in the vertical plane, it will now be understood why it is immaterial that the action of spherical lens 22 in the vertical plane is barred by screen 19. No harm, however, will result if, in embodiments of the invention other than those shown and described in the present specification, spherical lens 22 should image mirror 13 by acting in the vertical plane also.

Thus, a variable density record is produced on film 23 when it moves past the recording point 24 in a substantially vertical direction, as indicated by the arrow 28.

Figure 4:
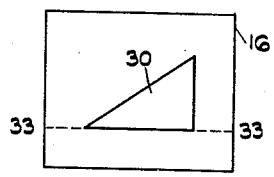

Opening 17 in screen 16 is shown in Fig. 1 as being an isosceles triangle. Screen 16 may, however, have any other opening whose image in the plane of slit 20 is a uniformly illuminated light spot with its horizontal extension gradually varying in a vertical direction, such a light spot having at least one edge which is inclined with respect to slit 20. The opening in screen 16 may, for example, be a right-angled triangle 30 with one of the sides adjacent to the right angle extending horizontally, as shown in Fig. 4, or there may be one or more saw-tooth projections extending into it as they do into openings 31 and 32 in Figs. 5 and 6. With opening 30 there appears at slit 20 a line of light the length of which varies at only one end, with opening 31 there appear two such lines, and with opening 32 a plurality of lines, their lengths varying at both their ends. But because cylindrical lens 25 does not act in the horizontal plane, there is produced in any case at the recording point 24 a single line image which varies in intensity when the line or lines of light appearing at slit 20 vary in length.

As the variations of the intensity of the final line image depend only upon the variations of the relative position—as produced by the deflection of mirror 13—of slit 20 and the inclined edge or edges of the uniformly illuminated light spot formed in its plane, the lower portion of screen 16 may be omitted if desired, as indicated by way of example by the broken line 33—33 in Fig. 4.

In order to effect a linear relation between the electrical impulses to be recorded and the transparency of the record used for their reproduction, the horizontal extension of the uniformly illuminated light spot formed in the plane of slit 20 may gradually vary in a non-linear manner. To that end, one or more of its inclined edges may be curved as are the two inclined edges of opening 34 shown in Fig. 7, a method of computing a suitable curve being disclosed, for example, in British specification 424,042 (I. G. Farbenindustrie). Thus, distortions may be cancelled which are introduced, for example, by the non-linear characteristics of the oscillograph galvanometer on which mirror 13 is mounted, or the emulsions of the recording and printing films, or both.

In Figs. 8 to 10, there is shown by way of further example another optical system capable of producing the line of light of varying length which appears at slit 20, and which is imaged at the recording point 24 by the action of cylindrical lens 25 in the vertical plane only. As this optical system is made up partly of the same elements that are employed in the optical system shown in Figs. 1 to 7 and described hereinabove, parts common to the two optical systems are designated by the same reference characters. It will thus be seen that filament 11 of incandescent lamp 10 is again focussed by condenser lens 12 on mirror 13, while the axis 44—44 about which mirror 13 is mounted to vibrate now extends vertically. Again, screen 16 is placed adjacent to lens 12. But the uniformly illuminated opening 47 in screen 16 now is a rectangle with one of its sides extending vertically. Again, spherical lens 18, acting in both the vertical and horizontal planes (see Figs. 9 and 10), forms a uniformly illuminated image 51 of opening 47 in the plane of slit 20, while image 51 illuminates again a portion of slit 20.

When mirror 13 is deflected in accordance with the electrical impulses to be recorded, it now moves image 51 horizontally, that is, lengthwise of slit 20, and this vibration of image 51 lengthwise of slit 20 again results in variations of the length of the illuminated portion of slit 20. As in the case employing the optical system shown in Figs. 1 to 3 with the opening 30 shown in Fig. 4, there now appears at slit 20 a line of light the length of which varies at only one end. Cylindrical lens 25, acting in the vertical plane only, again images this line of light, that is, the illuminated portion of slit 20, on film 23 at the recording point 24, while spherical lens 22, by its action in the horizontal plane, again images mirror 13 approximately at the recording point 24 past which film 23 again moves in a substantially vertical direction, as indicated by the arrow 26.

The result of this double imagery is the same as has been explained hereinabove in connection with Figs. 1 to 3. It is understood that the vibration of mirror 13 about the vertical axis 44—44 effects changes of the length of its image as formed by spherical lens 22. But these changes are of such a small order that they do not affect the objects to be achieved by the present invention, and hence it can legitimately be assumed for the purpose of the present specification that the length of the image of mirror 13 remains constant also when mirror 13 vibrates about a vertical axis.

Screen 16 when used in conjunction with a mirror vibrating about a vertical axis need not have a rectangular opening such as opening 47, shown in Fig. 8. It may have any other opening permitting the formation, by spherical lens 18, of an image thereof in the plane of slit 20 which is a uniformly illuminated-light spot, and whose vibration lengthwise of slit 20 varies the length of the portion of slit 20 illuminated by it. All that is required to accomplish that end is that the uniformly illuminated light spot have an edge which intersects slit 20 transversely, and this edge need not be straight as is edge 53, shown in Fig. 8, but may be curved or even ragged if desired.

It will thus be seen that the two optical systems shown in Figs. 1 to 7 and 8 to 10 of the present specification both have means for forming, in the plane of slit 20, a uniformly illuminated light spot whose vibration varies the length of the portion of slit 20 illuminated by it. The direction of vibration of the light spot with respect to slit 20 merely depends upon its shape. But there is no shape the uniformly illuminated light spot could have which would exclude its being vibrated in some direction with the result of varying the length of the illuminated portion of slit 20, it being understood that the light spot and slit 20 must be properly dimensioned in order to permit the degree of variation desired. Hence, with a light spot of suitable shape the axis of vibration of mirror 13 need neither be horizontal as is axis 14—14, shown in Fig. 1, nor vertical as is axis 44—44, shown in Fig. 8, but may have any inclination with respect to the vertical and horizontal planes of the optical system which it is found desirable to have in a particular case.

Each of the two optical systems shown in Figs. 1 to 7 and 8 to 10 of the present specification is capable of the following modifications:

(1) While spherical lens 18 is shown as being placed in front of mirror 13 so as to act on the light flux proceeding through the optical system both before and after it is reflected from mirror 13, it may also be placed so that it acts on only the incident or only the reflected light flux.

Instead of spherical lens 18 there may also be used two cylindrical lenses one of which may act on the incident and the other on the reflected light flux, the opening in screen 16 being imaged in the plane of slit 20 by one cylindrical lens acting in the vertical and by the other acting in the horizontal plane.

(2) Slit 20 may be replaced by a cylindrical lens which acts in the vertical plane only, as is set forth in detail in my co-pending application Ser. No. 343,617, filed on the same day and assigned to the same assignee as the present application.

(3) It has been pointed out hereinabove that it is immaterial that the action of spherical lens 22 in the vertical plane is barred by screen 19. Hence, there may be used in place of spherical lens 22 a cylindrical lens 62 with its cylinder axis vertical, as shown in Fig. 11, lens 62 having the same focal length and aperture as lens 22 but acting in the horizontal plane only.

Furthermore, while spherical lens 22 and cylindrical lens 62 are shown in Figs. 1 to 3, 8 to 10, and 11, as being placed between mirror 13 and screen 19, they may also be placed between screen 19 and cylindrical lens 25.

In case spherical lens 22 and cylindrical lens 62 are placed between screen 19 and cylindrical lens 25, and in case cylindrical lens 62 is placed between mirror 13 and screen 19, these lenses may have any position which is consistent with their function to image, by their action in the horizontal plane, mirror 13 approximately at the recording point 24. If, however, spherical lens 22 is placed between mirror 13 and screen 19, its position should preferably be in the immediate vicinity of screen 19, as shown in the drawings, so that it does not interfere, by its action in the vertical plane, with the imagery of the opening in screen 19 by spherical lens 19.

(4) The final line image of constant length and varying intensity which is produced by the cooperation of cylindrical lens 25 and spherical lens 22, or cylindrical lens 25 and cylindrical lens 62, has been shown and described hereinabove as being formed immediately on film 23. It may, however, also be re-imaged on film 23 by suitable means inserted at a convenient place between cylindrical lens 25 and film 23.

This re-imagery may be effected by means acting in both the vertical and horizontal planes and either with or without changing, in either one plane or in the two planes, the dimensions of the final line image. It may also be effected by means acting in the vertical plane only, for example, by inserting between cylindrical lens 25 and film 23 a cylindrical lens with its cylinder axis horizontal, concentrating lenses 22 or 62 in this case imaging mirror 13 through the two cylindrical lenses approximately at the recording point 24.

(5) It has been assumed hereinbefore that the final line image formed at the recording point 24 is of uniform illumination throughout its entire length. Actually, this is true only in case the image of mirror 13 formed by concentrating lenses 22 or 62 is in focus at the recording point 24. If it is out of focus with respect thereto, the illumination of the final line image decreases at its ends, and only its central portion is uniformly illuminated. The edges of the impulse record are therefore blurred in this case and should be screened off when prints of the record are made, such screening off now being commonly practiced in printing from variable density records.

If, however, it is desired to eliminate the blurred edges when making the original record on film 23, two screens 65 and 66 or like means having vertical edges 67 and 68 may be employed, edges 67 and 68 being spaced apart so as to confine between themselves the uniform illuminated central portion of the final line image. Screens 65 and 66 may be placed between cylindrical lens 25 and film 23, as shown in Fig. 12, or in front of lamp 10 or mirror 13.

Provided that the angle subtended by the horizontal extension of mirror 13 at the recording point 24 is larger than the angle subtended there by the illuminated portion of slit 20 when it is at its maximum length, the final line image will have a uniformly illuminated central portion also when concentrating lenses 22 or 62 are omitted from the optical systems shown and described hereinabove. The omission of the concentrating lenses, however, involves a considerable loss of illumination and hence is generally undesirable. But it will now be seen that the variable density effect proper is obtained at the recording point 24 by the cooperation of only cylindrical lens 25 and those parts of the optical systems which produce, and vary the length of, the line of light appearing at slit 20, while concentrating lenses 22 or 62 merely serve to increase the light efficiency of the optical systems so that they will, under the usual working conditions, give practical results.

The fact that lens 25 has to be cylindrical in order to obtain the variable density effect desired, has inherent advantages: Cylindrical lens 25 may have a short focal length, which permits of building the optical systems with small physical size, and a cylindrical lens of short focal length is less expensive than a spherical lens system well enough corrected to be capable of forming, over the same length, an equally sharp line image. The optical systems may therefore be built at comparatively little cost.

(6) Normally, the optical systems disclosed in the present specification are so adjusted that in the rest or zero position of mirror 13, that is, when no electrical impulses are applied to the oscillograph galvanometer on which it is mounted, approximately one-half of slit 20 is illuminated by the light spot of uniform illumination formed in its plane. If, however, sound is to be recorded by the method generally known as "noiseless recording," mirror 13 may be biased in the manner disclosed in L. T. Robinson's U. S. specification 1,854,159.

Alternatively, screen 16 may be vibrated vertically when employed with the optical system shown in Figs. 1 to 7 of the present specification, or horizontally when employed with the optical system shown in Figs. 8 to 10 thereof. To that end, it may be connected by a stem 70, shown by way of example in Figs. 13a and 13b, or like means, to a motor to which an electric current corresponding to the envelope of the sound waves to be recorded is applied. Such a motor and a method for its operation is disclosed, for example, in H. McDowell, Jr.'s. U. S. Specification 1,855,197.

Figure 5:
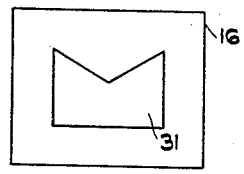
Figure 6:
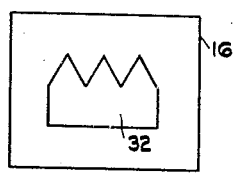
Figure 7:
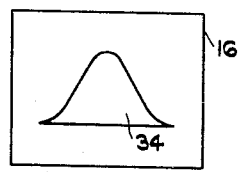

Finally, when screen 16, employed with the optical system shown in Figs. 1 to 3 of the present specification, has the opening 17 shown in Fig. 1 thereof, the opening 31 shown in Fig. 5, the opening 34 shown in Fig. 7, or a similar opening, noiseless recording may also be achieved by providing adjacent to screen 16 a twin shutter mechanism similar to that disclosed in H. J. Hasbrouck's U. S. specification 2,102,778.

The application of any of the methods for noiseless recording mentioned above will result in shifting the mean density of the sound record produced on film 23 in accordance with the envelope of the sound waves to be recorded.

(7) The optical system disclosed in Figs. 1 to 7 of the present specification differs from the optical system disclosed in my co-pending application Ser. No. 343,616, filed on the same day and assigned to the same assignee as the present specification, merely in that the opening in screen 16 is imaged in the plane of slit 20 by means acting in both the vertical and horizontal planes instead of by means acting in the vertical plane only. The same final result, that is, a variable density record, may therefore be accomplished by employing, with mirror 13 vibrating about a horizontal axis, either a spherical lens or a cylindrical lens with its cylinder axis horizontal for the imagery of the opening in screen 16. This interchangeability of the means imaging the opening in screen 16 in the plane of slit 20 affords an advantageous degree of freedom in designing a particular optical system in accordance with the inventions disclosed in the present specification and the co-pending application referred to above.

Furthermore, the two optical systems disclosed in Figs. 1 to 7 and 8 to 10 of the present specification and the optical system disclosed in my application Ser. No. 343,616 have the common advantage that their adjustment is not critical in that the image of the opening in screen 16 need be formed only approximately in the plane of slit 20, that is, either exactly in this plane or in the neighborhood thereof. It is understood that when formed in the neighborhood of the plane of slit 20 by a spherical lens—as disclosed in the present specification—the image of the opening in screen 16 is a uniformly illuminated light spot having blurred edges, and wherever the term "uniformly illuminated light spot" occurs in the present description and in the appended claims it should be read as including also such a light spot.

However, in contradistinction to the optical system disclosed in my application Ser. No. 343,616 and also the optical systems for variable density recording known heretofore, there is formed in the optical systems disclosed in Figs. 1 to 7 and 8 to 10 of the present specification a uniformly illuminated light spot in the plane of a slit. This permits visible adjustment of the optical systems built in accordance with the present invention, and also visible monitoring of the recording of the electrical impulses, in a particularly convenient and accurate manner.

Many other modifications of the invention will readily suggest themselves to those skilled in the art. The invention, therefore, is not to be limited, except in so far as is necessitated by the prior art and by the spirit of the appended claims.

What is claimed is:

1. An optical system of the class described for use with a film which moves at the recording point in a substantially vertical direction, having, in combination, means forming a slit which extends horizontally, means for illuminating said slit, means for varying the length of the illuminated portion of said slit, means imaging said slit at said recording point and acting in the vertical plane only, and means acting in the horital plane and concentrating at said recording point the light flux passing through said slit.

2. An optical system of the class described for use with a film which moves at the recording point in a substantially vertical direction, having, in combination, means forming a slit which extends horizontally, means for forming a uniformly illuminated light spot in the plane of said slit, a mirror adapted to vibrate said light spot in such a manner as to vary the length of that portion of said slit which is illuminated by said light spot, means imaging said slit at said recording point and acting in the vertical plane only, and means imaging said mirror approximately at said recoring point and acting in the horizontal plane.

3. An optical system of the class described for use with a film which moves at the recording point in a substantially vertical direction, having, in combination, means forming a slit which extends horizontally, means for forming a uniformly illuminated light spot in the plane of said slit, a mirror adapted to vibrate said light spot in such a manner as to vary the length of that portion of said slit which is illuminated by said light spot, means imaging said slit at said recording point and acting in the vertical plane only, and a cylindrical lens having its cylinder axis vertical and imaging said mirror approximately at said recording point.

4. An optical system of the class described for use with a film which moves at the recording point in a substantially vertical direction, having, in combination, means forming a slit which extends horizontally, means for forming in the plane of said slit a uniformly illuminated light spot the horizontal extension of which gradually varies in a vertical direction, means for vibrating said light spot across said slit, and means imaging said slit at said recording point and acting in the vertical plane only.

5. An optical system as defined in claim 4 wherein said vibrating means are adapted to vibrate said light spot in accordance with the electrical impulses to be recorded and the horizontal extension of said light spot gradually varies in a vertical direction and in a non-linear manner so as to effect a linear relation between said electrical impulses and the transparency of the record used for the reproduction thereof.

6. An optical system of the class described for use with a film which moves at the recording point in a substantially vertical direction, having, in combination, means forming a slit which extends horizontally, a screen with an opening the horizontal extension of which gradually varies in a vertical direction, means for uniformly illuminating said opening, means acting in both the vertical and horizontal planes for forming an image of said opening in the plane of said slit, means for vibrating said image across said slit, and means imaging said slit at said recording point and acting in the vertical plane only.

7. An optical system as defined in claim 6 wherein said vibrating means are adapted to vibrate said image in accordance with the electrical impulses to be recorded and said screen is vertically movable in accordance with the envelope of said electrical impulses.

8. An optical system of the class described for use with a film which moves at the recording point in a substantially vertical direction, having, in combination, means forming a slit which extends horizontally, a screen with an opening the horizontal extension of which gradually varies in a vertical direction, means for uniformly illuminating said opening, means acting in both the vertical and horizontal planes for forming an image of said opening in the plane of said slit, a mirror adapted to vibrate about a horizontal axis so as to move said image across said slit, means imaging said slit at said recording point and acting in the vertical plane only, and means imaging said mirror approximately at said recording point and acting in the horizontal plane.

9. An optical system of the class described for use with a film which moves at the recording point in a substantially vertical direction, having, in combination, a light source, a mirror adapted to vibrate about a horizontal axis, means for directing light from said light source upon said mirror, means placed between said mirror and said film and forming a slit which extends horizontally, a screen placed between said light source and said mirror and having an opening the horizontal extension of which gradually varies in a vertical direction, said opening being uniformly illuminated by said light source, means acting in both the vertical and horizontal planes for forming an image of said opening in the plane of said slit, said image being movable by the vibration of said mirror, means imaging said slit at said recording point and acting in the vertical plane only, and means imaging said mirror approximately at said recording point and acting in the horizontal plane.

10. An optical system of the class described for use with a film which moves at the recording point in a substantially vertical direction, having, in combination, means forming a slit which extends horizontally, a screen with an opening having an edge which is inclined with respect to said slit, means for uniformly illuminating said opening, means acting in both the vertical and horizontal planes for forming an image of said opening in the plane of said slit, a mirror adapted to vibrate about a horizontal axis so as to move said image across said slit, thereby varying the length of that portion of said slit which is illuminated by said image, means imaging said slit at said recording point and acting in the vertical plane only, and means imaging said mirror approximately at said recording point and acting in the horizontal plane.

11. An optical system as defined in claim 10 wherein said mirror is adapted to vibrate about said horizontal axis in accordance with electrical impulses to be recorded on said film and said screen is vertically movable in accordance with the envelope of said electrical impulses.

12. An optical system of the class described for use with a film which moves at the recording point in a substantially vertical direction, having, in combination, a light source, a mirror adapted to vibrate about a horizontal axis, means for directing light from said light source upon said mirror, means placed between said mirror and said film and forming a slit which extends horizontally, a screen placed between said light source and said mirror and having an opening with an edge which is inclined with respect to said slit, said opening being uniformly illuminated by said light source, means acting in both the vertical and horizontal planes for forming an image of said opening in the plane of said slit, said image being movable by the vibration of said mirror in such a manner as to vary the length of that portion of said slit which is illuminated by said image, means imaging said slit at said recording point and acting in the vertical plane only, and means imaging said mirror approximately at said recording point and acting in the horizontal plane.

13. An optical system of the class described for use with a film which moves at the recording point in a substantially vertical direction, having, in combination, means forming a slit which extends horizontally, a screen with an opening which is an isosceles triangle with its base extending horizontally, means for uniformly illuminating said opening, means acting in both the vertical and horizontal planes for forming an image of said opening in the plane of said slit, a mirror adapted to vibrate about a horizontal axis so as to move said image across said slit, means imaging said slit at said recording point and acting in the vertical plane only, and means imaging said mirror approximately at said recording point and acting in the horizontal plane.

14. An optical system as defined in claim 13 wherein said mirror is adapted to vibrate about said horizontal axis in accordance with electrical impulses to be recorded on said film and said screen is vertically movable in accordance with the envelope of said electrical impulses.

15. An optical system of the class described for use with a film which moves at the recording point in a substantially vertical direction, having, in combination, a light source, a mirror adapted to vibrate about a horizontal axis, means for directing light from said light source upon said mirror, means placed between said mirror and said film and forming a slit which extends horizontally, a screen placed between said light source and said mirror and having an opening which is an isosceles triangle with its base extending horizontally, said opening being uniformly illuminated by said light source, means acting in both the vertical and horizontal planes for forming an image of said opening in the plane of said slit, said image being movable by the vibration of said mirror, means imaging said slit at said recording point and acting in the vertical plane only, and means imaging said mirror approximately at said recording point and acting in the horizontal plane.

16. An optical system of the class described for use with a film which moves at the recording point in a substantially vertical direction, having, in combination, means forming a slit which extends horizontally, a screen with an opening which is a right-angled triangle with one of the sides adjacent to the right angle extending horizontally, means for uniformly illuminating said opening, means acting in both the vertical and horizontal planes for forming an image of said opening in the plane of said slit, a mirror adapted to vibrate about a horizontal axis so as to move said image across said slit, means imaging said slit at said recording point and acting in the vertical plane only, and means imaging said mirror approximately at said recording point and acting in the horizontal plane.

17. An optical system as defined in claim 16 wherein said mirror is adapted to vibrate about said horizontal axis in accordance with electrical impulses to be recorded on said film and said screen is vertically movable in accordance with the envelope of said electrical impulses.

18. An optical system of the class described for use with a film which moves at the recording point in a substantially vertical direction, having, in combination, a light source, a mirror adapted to vibrate about a horizontal axis, means for directing light from said light source upon said mirror, means placed between said mirror and said film and forming a slit which extends horizontally, a screen placed between said light source and said mirror and having an opening which is a right-angled triangle with one of the sides adjacent to the right angle extending horizontally, said opening being uniformly illuminated by said light source, means acting in both the vertical and horizontal planes for forming an image of said opening in the plane of said slit, said image being movable by the vibration of said mirror, means imaging said slit at said recording point and acting in the vertical plane only, and means imaging said mirror approximately at said recording point and acting in the horizontal plane.

19. An optical system of the class described for use with a film which moves at the recording point in a substantially vertical direction, having, in combination, means forming a slit which extends horizontally, a screen with an opening having an edge, means for uniformly illuminating said opening, means acting in both the vertical and horizontal planes for imaging said opening in the plane of said slit so as to form an image of said edge which transversely intersects said slit, a mirror adapted to vibrate about a vertical axis so as to move said image lengthwise of said slit, thereby varying the length of that portion of said slit which is illuminated by said image, means imaging said slit at said recording point and acting in the vertical plane only, and means imaging said mirror approximately at said recording point and acting in the horizontal plane.

20. An optical system as defined in claim 19 wherein said mirror is adapted to vibrate about said vertical axis in accordance with electrical impulses to be recorded on said film and said screen is horizontally movable in accordance with the envelope of said electrical impulses.

21. An optical system of the class described for use with a film which moves at the recording point in a substantially vertical direction, having, in combination, a light source, a mirror adapted to vibrate about a vertical axis, means for directing light from said light source upon said mirror, means placed between said mirror and said film and forming a slit which extends horizontally, a screen placed between said light source and said mirror and having an opening with an edge, said opening being uniformly illuminated by said light source, means acting in both the vertical and horizontal planes for imaging said opening in the plane of said slit so as to form an image of said edge which transversely intersects said slit and is movable by the vibration of said mirror in such a manner as to vary the length of that portion of said slit which is illuminating by said image, means imaging said slit at said recording point and acting in the vertical plane only, and means imaging said mirror approximately at said recording point and acting in the horizontal plane.

22. An optical system of the class described for use with a film which moves at the recording point in a substantially vertical direction, having, in combination, means forming a slit which extends horizontally, a screen with an opening which is a rectangle with one of its sides extending vertically, means for uniformly illuminating said opening, means acting in both the vertical and horizontal planes for forming an image of said opening in the plane of said slit, a mirror adapted to vibrate about a vertical axis so as to move said image lengthwise of said slit, means imaging said slit at said recording point and acting in the vertical plane only, and means imaging said mirror approximately at said recording point and acting in the horizontal plane.

23. An optical system as defined in claim 22 wherein said mirror is adapted to vibrate about said vertical axis in accordance with electrical impulses to be recorded on said film and said screen is horizontally movable in accordance with the envelope of said electrical impulses.

24. An optical system of the class described for use with a film which moves at the recording point in a substantially vertical direction, having, in combination, a light source, a mirror adapted to vibrate about a vertical axis, means for directing light from said light source upon said mirror, means placed between said mirror and said film and forming a slit which extends horizontally, a screen placed between said light source and said mirror and having an opening which is a rectangle with one of its sides extending vertically, said opening being uniformly illuminated by said light source, means acting in both the vertical and hrizontal planes for forming an image of said opening in the plane of said slit, said image being movable by the vibration of said mirror, means imaging said slit at said recording point and acting in the vertical plane only, and means imaging said mirror approximately at said recording point and acting in the horizontal plane.

JOHN A. MAURER, Jr.